United States Patent
Zhang

(10) Patent No.: US 11,842,004 B2
(45) Date of Patent: Dec. 12, 2023

(54) METHOD OF SIGNAL TRANSMISSION, TOUCH CONTROL CHIP AND ELECTRONIC DEVICE

(71) Applicant: SHENZHEN GOODIX TECHNOLOGY CO., LTD., Shenzhen (CN)

(72) Inventor: Guanjun Zhang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 125 days.

(21) Appl. No.: 17/503,015

(22) Filed: Oct. 15, 2021

(65) Prior Publication Data

US 2022/0035502 A1    Feb. 3, 2022

Related U.S. Application Data

(63) Continuation of application No. PCT/CN2019/128285, filed on Dec. 25, 2019.

(51) Int. Cl.
  *G06F 3/041*    (2006.01)
  *G06F 3/044*    (2006.01)

(52) U.S. Cl.
  CPC ........ *G06F 3/04162* (2019.05); *G06F 3/0441* (2019.05); *G06F 2203/04106* (2013.01)

(58) Field of Classification Search
  CPC ............... G06F 3/04162; G06F 3/0441; G06F 2203/04106
  See application file for complete search history.

(56) References Cited

U.S. PATENT DOCUMENTS

| 4,802,003 | A | 1/1989 | Takei |
| 9,495,024 | B2 | 11/2016 | Watanabe |
| 9,652,058 | B2 | 5/2017 | Watanabe |
| 9,939,975 | B2 | 4/2018 | Ye |
| 10,078,379 | B2 | 9/2018 | Watanabe |
| 10,241,597 | B2 | 3/2019 | Jung |
| 10,466,816 | B2 | 11/2019 | Watanabe |
| 2012/0013555 | A1 | 1/2012 | Maeda et al. |
| 2015/0090884 | A1 | 4/2015 | Bouchilloux |
| 2016/0239123 | A1* | 8/2016 | Ye ........................ G06F 3/04166 |
| 2016/0299583 | A1 | 10/2016 | Watanabe |
| 2017/0060274 | A1 | 3/2017 | Watanabe |

(Continued)

FOREIGN PATENT DOCUMENTS

| CN | 103729073 A | 4/2014 |
| CN | 104571732 A | 4/2015 |

(Continued)

*Primary Examiner* — Lisa S Landis

(57) ABSTRACT

The present application provides a method of signal transmission, which can improve transmission performance of an uplink signal between a touch screen and a stylus. The method is performed by a touch control chip in an electronic device, a touch screen of the electronic device includes a transmission channel for sending an uplink signal to a stylus, and the method includes: detecting whether a user's hand and/or the stylus approaches or touches the touch screen; determining a sending mode of the uplink signal according to a detection result, where the transmission channel for sending the uplink signal in the touch screen is different in different sending modes.

16 Claims, 6 Drawing Sheets

(56) References Cited

U.S. PATENT DOCUMENTS

| | | |
|---|---|---|
| 2017/0249029 A1 | 8/2017 | Watanabe |
| 2017/0285771 A1 | 10/2017 | Jung |
| 2019/0018508 A1 | 1/2019 | Watanabe |
| 2019/0146602 A1 | 5/2019 | Kadowaki |
| 2020/0064939 A1 | 2/2020 | Watanabe |
| 2020/0201505 A1 | 6/2020 | Jung |

FOREIGN PATENT DOCUMENTS

| | | |
|---|---|---|
| CN | 105955544 A | 9/2016 |
| CN | 107077226 A | 8/2017 |
| CN | 107272921 A | 10/2017 |
| CN | 109756625 A | 5/2019 |
| CN | 111427463 A | 7/2020 |
| JP | 2014203211 A | 10/2014 |

\* cited by examiner

METHOD OF SIGNAL TRANSMISSION, TOUCH CONTROL CHIP AND ELECTRONIC DEVICE

CROSS-REFERENCE TO RELATED APPLICATIONS

This application is a continuation of International Application No. PCT/CN2019/128285, filed on Dec. 25, 2019, the disclosure of which is hereby incorporated by reference in its entirety.

TECHNICAL FIELD

Embodiments of the present application relate to the field of information technology, and in particular, to a method of signal transmission, a touch control chip and an electronic device.

BACKGROUND

At present, as a main peripheral input accessory of an electronic device, a stylus has gradually attracted attention of market. A pen point of the stylus can transmit a signal, and a number of detecting electrodes in horizontal and vertical directions are distributed on a touch screen. Therefore, the detecting electrodes may be used to detect the signal transmitted at the pen point, and a two-dimensional position coordinate of the pen point on the touch screen can be calculated according to a detection signal.

At the same time, the touch screen can send an uplink (UL) signal to the stylus through the detection electrodes, so as to implement a two-way communication between the touch screen and the stylus. However, a user usually operates the stylus by hand, thus a user's hand may cause an effective uplink signal received by the stylus to be affected.

SUMMARY

Embodiments of the present application provides a method of signal transmission, a touch control chip and an electronic device, which can improve transmission performance of an uplink signal between a touch screen and a stylus.

In a first aspect, a method of signal transmission is provided, the method is performed by a touch control chip in an electronic device, a touch screen of the electronic device comprises a transmission channel for sending an uplink signal to a stylus, and the method includes:

detecting whether a user's hand and/or the stylus approaches or touches the touch screen;

determining a sending mode of the uplink signal according to a detection result, where the transmission channel for sending the uplink signal in the touch screen is different in different sending modes.

In a possible implementation manner, the transmission channel for sending the uplink signal in the touch screen is different in different sending modes, including at least one of the following differences: a position of the transmission channel, the number of the transmission channel, and a working timing of the transmission channel.

In a possible implementation manner, determine the sending mode of the uplink signal according to the detection result, including: determining that the sending mode is a first sending mode if it is detected that the hand does not approach or touch the touch screen, where all transmission channels in the touch screen in the first sending mode send the uplink signal simultaneously.

In a possible implementation manner, determine the sending mode of the uplink signal according to the detection result, including: determining the sending mode according to whether the stylus approaches or touches the touch screen if it is detected that the hand approaches or touches the touch screen.

In a possible implementation manner, determine the sending mode according to whether the stylus approaches or touches the touch screen, including: determining that the sending mode is a sending transmission mode if it is not detected that the stylus approaches or touches the touch screen, where multiple groups of the transmission channels in the touch screen in the second sending mode send the uplink signal in sequence, and the number of the transmission channels in each group in the multiple groups of the transmission channels is less than a preset value.

In a possible implementation manner, the preset value is the number of the transmission channels covered by a projection of the hand on the touch screen when a user operates the stylus.

In a possible implementation manner, the preset value is between 6 and 10.

In a possible implementation manner, the number of the transmission channels in the multiple groups of the transmission channels is the same or different.

In a possible implementation manner, determine the sending mode according to whether the stylus approaches or touches the touch screen, including: determining that the sending mode is a third sending mode if it is detected that the stylus approaches or touches the touch screen, where the transmission channel located near the stylus in the touch screen in the third sending mode sends the uplink signal, and the number of the transmission channels near the stylus is less than a preset value.

In a possible implementation manner, the preset value is the number of the transmission channels covered by a projection of a hand on the touch screen when the user operates the stylus.

In a possible implementation manner, the preset value is between 6 and 10.

In a possible implementation manner, the transmission channel for sending the uplink signal in the touch screen includes a driving channel and/or a detection channel.

In a second aspect, an apparatus of signal transmission is provided, where the apparatus is provided in an electronic device, a touch screen of the electronic device comprises a transmission channel for sending an uplink signal to a stylus, and the apparatus includes:

a detection module configured to detect whether a user's hand and/or the stylus approaches or touches the touch screen;

a processing module configured to determine a sending mode of the uplink signal according to a detection result, where the transmission channel for sending the uplink signal in the touch screen is different in different sending modes.

In a possible implementation manner, the processing module is specifically configured to: determine that the sending mode is a first sending mode if the detection module detects that the hand does not approach or touch the touch screen, where all transmission channels in the touch screen in the first sending mode send the uplink signal simultaneously.

In a possible implementation manner, the processing module is specifically configured to: determine the sending mode according to whether the stylus approaches or touches the touch screen if the detection module detects that the hand approaches or touches the touch screen.

In a possible implementation manner, the processing module is specifically configured to: determine that the sending mode is a second sending mode if the detection module does not detect that the stylus approaches or touches the touch screen, where multiple groups of the transmission channels in the touch screen in the second sending mode send the uplink signal in sequence, and the number of the transmission channels in each group in the multiple groups of the transmission channels is less than a preset value.

In a possible implementation manner, the preset value is the number of the transmission channels covered by a projection of the hand on the touch screen when a user operates the stylus.

In a possible implementation manner, the preset value is between 6 and 10.

In a possible implementation manner, the number of the transmission channels in the multiple groups of the transmission channels is the same or different.

In a possible implementation manner, the processing module is specifically configured to: determine that the sending mode is a third sending mode if the detection module detects that the stylus approaches or touches the touch screen, where the transmission channel located near the stylus in the touch screen in the third sending mode sends the uplink signal, and the number of the transmission channels near the stylus is less than a preset value.

In a possible implementation manner, the preset value is the number of the transmission channels covered by a projection of the hand on the touch screen when a user operates the stylus.

In a possible implementation manner, the preset value is between 6 and 10.

In a possible implementation manner, the transmission channel for sending the uplink signal in the touch screen includes a driving channel and/or a detection channel.

In a third aspect, a touch control chip is provided, including: the apparatus of signal transmission in the foregoing second aspect and any one of the possible implementation manners of the second aspect.

In a fourth aspect, an electronic device is provided, including: a touch screen, the touch screen includes a transmission channel for sending an uplink signal to a stylus; and the touch control chip in the foregoing third aspect and any one of the possible implementation manners of the third aspect.

Based on the technical solution, by detecting whether the user's hand and/or the stylus approaches or touches the touch screen, the sending mode of the uplink signal is determined according to the detection result. Because the transmission channel for sending the uplink signal in the touch screen is different in different sending modes, different transmission channels can be selected to send the uplink signal in different circumstances, so that transmission of the uplink signals is more flexible, improving transmission performance of the uplink signal.

DESCRIPTION OF EMBODIMENTS

The following describes technical solutions of the present application with reference to accompanying drawings.

At present, in a stylus touch control system, a two-way communication can be implemented between a stylus and a touch screen. The touch screen can be used to send an uplink signal to the stylus. For example, the uplink signal can be used for a synchronization between the stylus and the touch screen, or the touch screen can send a command to the stylus through the uplink signal to notify the stylus of a coding frequency, a timing of coordinate reporting or other information. Transmission of the uplink signal can be based on a universal stylus initiative (USI) protocol, and the touch screen can send a direct sequence spread spectrum (DSSS) signal as the uplink signal through a touch control integrated circuit (IC), so as to transmit information to the stylus. In an actual application, when a hand touches the touch screen, the uplink signal sent by the touch screen can be transmitted to ground (GND) of the stylus through the hand, causing that the signal amount of the uplink signal received by the stylus is reduced, which affects performance of a touch control system.

Figure 1:
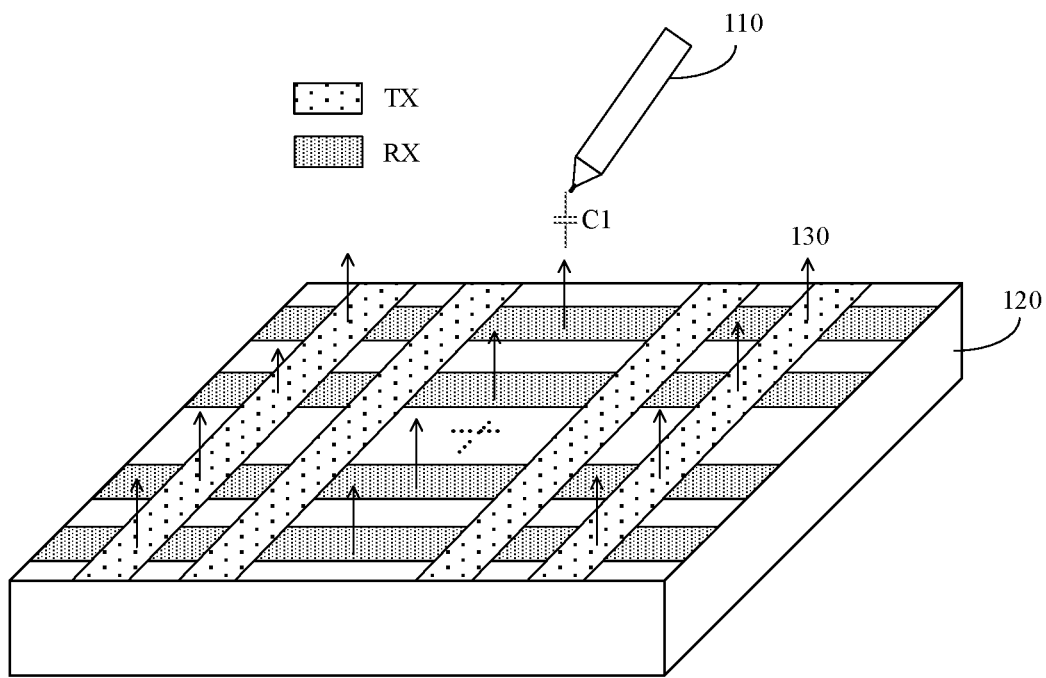
FIG. 1 is a schematic diagram of only a stylus above a touch screen.
Figure 2:
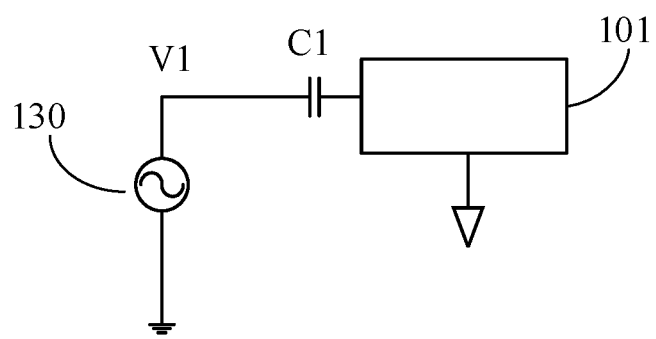
FIG. 2 is an equivalent circuit between the stylus and the touch screen shown in FIG. 1.

FIG. 1 shows a case of only a stylus above a touch screen. FIG. 2 shows an equivalent circuit between the stylus and the touch screen. A touch control chip can send the uplink signal to the stylus through a transmission channel in the touch screen.

In embodiments of the present application, the transmission channel in the touch screen can be all or part of channels in the touch screen. For example, for a self-capacitance touch screen, it includes a horizontal channel and a vertical channel, or a horizontal electrode and a vertical electrode, where the transmission channel can be the horizontal channel, or the transmission channel is the vertical channel, or both the horizontal channel and the vertical channel can be used to send the uplink signal. For another example, for a mutual-capacitance touch screen, the transmission channel can be a driving channel in the touch screen, that is, a driving electrode, which is represented by TX; the transmission channel can also be a detection channel in the touch screen, that is, a detection electrode, which is represented by RX; or the transmission channel in the touch screen includes the driving channel and the detection channel, that is, both the driving channel TX and the detection channel RX can be used to send the uplink signal. The following is described by an example of a mutual-capacitance.

As shown in FIG. 1, a stylus 110 above a touch screen 120 includes a receiving circuit 101 for receiving an uplink signal, and a capacitance C1 is formed between the receiving circuit 101 and a transmission channel currently sending the uplink signal. The transmission channel can be considered as a signal source of the uplink signal. As shown in FIG. 2, the capacitance C1 is formed between the receiving circuit 101 and a signal source 130.

Figure 3:
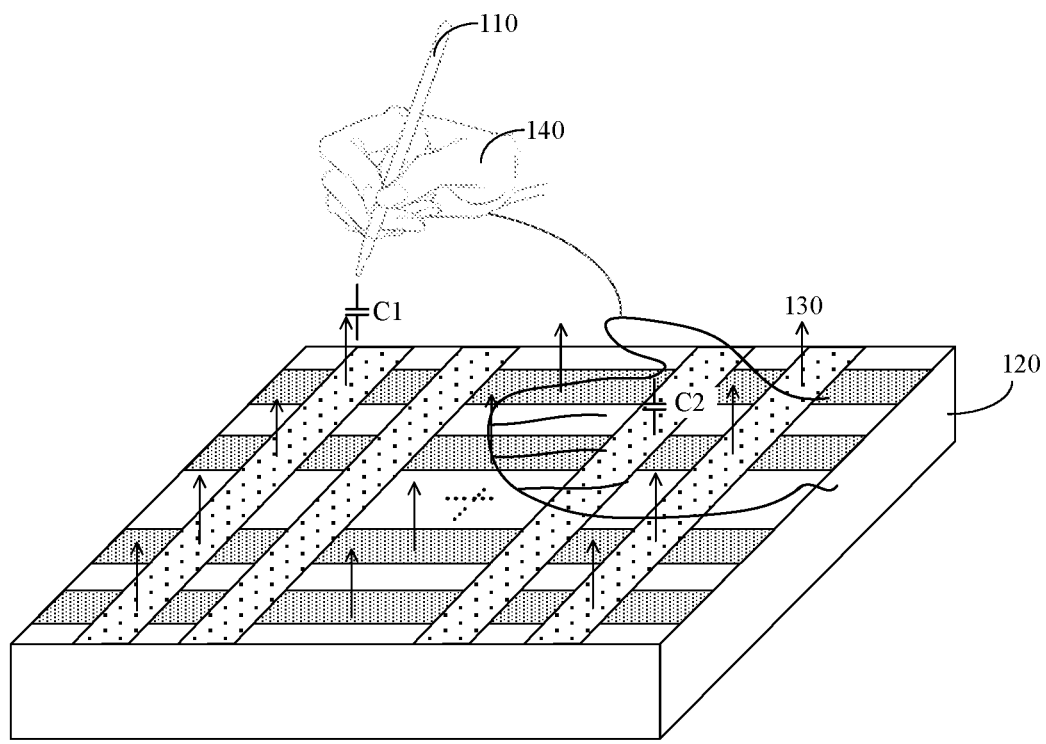
FIG. 3 is a schematic diagram of a stylus and a hand above a touch screen.
Figure 4:
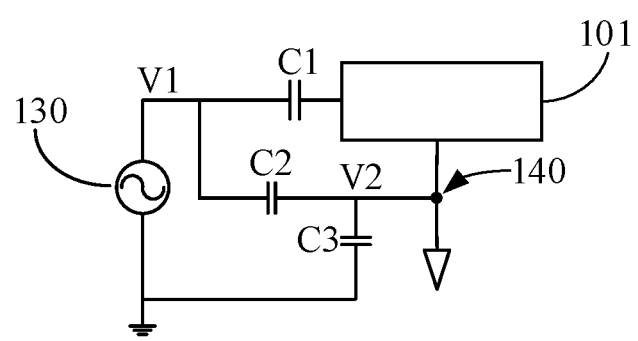
FIG. 4 is an equivalent circuit between the stylus, the hand and the touch screen shown in FIG. 3.

When a hand 140 approaches or touches the touch screen 120, the hand may also receive the uplink signal. As shown in FIG. 3 and FIG. 4, the capacitance C1 is formed between the receiving circuit 101 in the stylus 110 and the signal source 130, and a capacitance C2 is formed between the hand 140 and the signal source 130. In addition, a capacitance C3 is formed between the hand 140 and GND of the touch screen 120. It can be seen from FIG. 4 that a divided voltage obtained on the hand 140 is $V2=V1*C2/(C2+C3)$. Because the hand 140 is required to hold the stylus 110 for writing, the uplink signal received by the hand 140 can be transmitted to the GND of the stylus 110. Because the receiving circuit 101 of the stylus 110 operates relative to the GND of the stylus 110, a voltage corresponding to a valid uplink signal received by the receiving circuit 101 at this time changes from V1 to V1-V2. In order to reduce a voltage V2, the capacitance C2 between the hand 140 and the signal source 130 needs to be reduced, so as to reduce an influence of the hand 140 on the uplink signal.

To this end, the present application provides a method of signal transmission to reduce an influence of the hand on the uplink signal in the touch control system.

Figure 5:
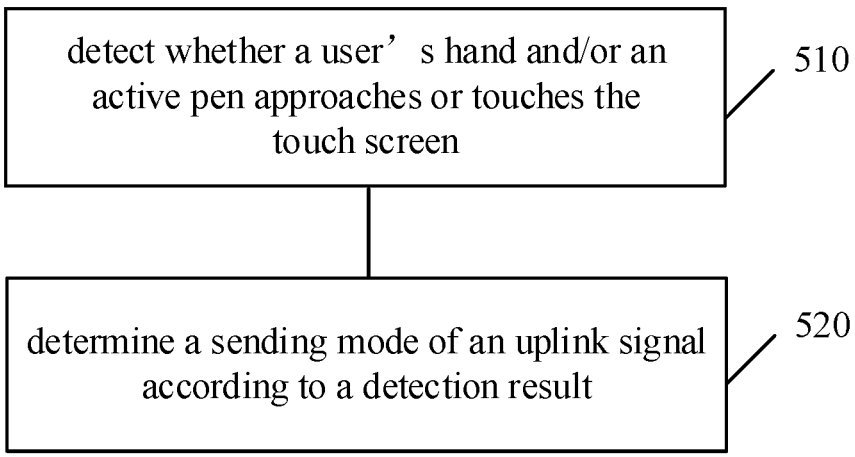
FIG. 5 is a schematic flowchart of a method of signal transmission according to an embodiment of the present application.

FIG. 5 is a schematic flowchart of a method of signal transmission according to an embodiment of the present application. A method 500 may be performed by an apparatus of signal transmission in an electronic device, for example, by a touch controller or the touch control chip. The touch screen of the electronic device includes the transmission channel for sending the uplink signal to the stylus. As shown in FIG. 5, the method 500 includes part of or all the following steps.

In 510, detect whether a user's hand and/or the stylus approaches or touches the touch screen.

In 520, determine a transmission mode of the uplink signal according to a detection result.

Specifically, the transmission channel for sending the uplink signal in the touch screen is different in different sending modes. For example, in different sending modes, at least one of a position, the number, a working timing and so on of the transmission channel used for sending the uplink signal in the touch screen is different.

The embodiments of the present application provide three sending modes, namely, a first sending mode, a second sending mode, and a third sending mode. Specifically, in the first sending mode, all transmission channels in the touch screen send the uplink signal simultaneously; in the second sending mode, multiple groups of the transmission channels in the touch screen send the uplink signal in sequence; and in the third sending mode, the transmission channel located near the stylus in the touch screen sends the uplink signal.

It should be understood that the transmission channel for sending the uplink signal in the touch screen includes a driving channel and/or a detection channel. That is, it can be set that when the touch screen sends the uplink signal, only the driving channel is used, or only the detection channel is used, or both the driving channel and the detection channel are used.

The three sending modes are described in detail below in combination with FIGS. 6-12. The touch screen in the embodiments of the present application can be a touch screen based on self-capacitance or mutual-capacitance. The following only uses the mutual-capacitance touch screen as an example for description.

In an implementation manner, in 520, if it is detected that the finger does not approach or touch the touch screen, it can be determined that the sending mode for sending the uplink signal is the first sending mode.

Specifically, all transmission channels in the touch screen in the first sending mode send the uplink signal simultaneously. It should be understood that all transmission channels can be all driving channels, all detection channels, or include all driving channels and all detection channels.

Figure 6:
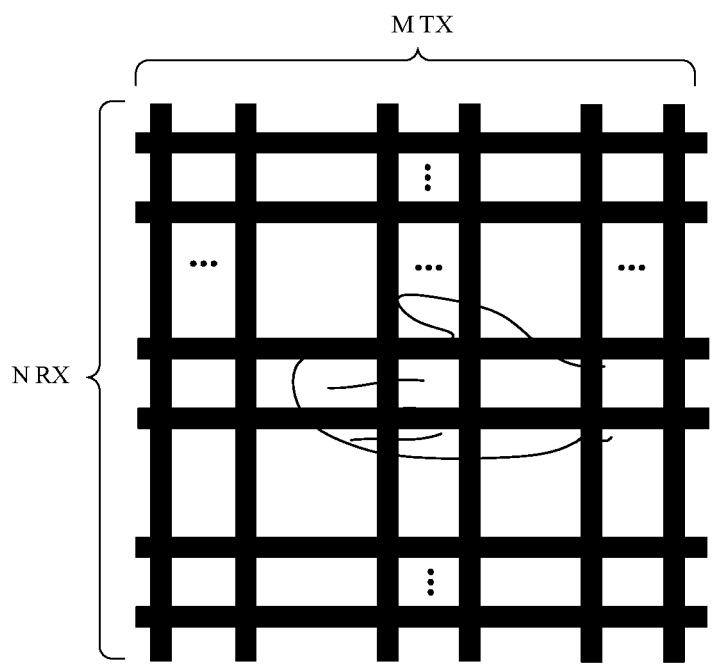
FIG. 6 is a schematic diagram of a first sending mode according to an embodiment of the present application.

For example, as shown in FIG. 6, M driving channels TX and N detection channels RX in the touch screen send the uplink signal to the stylus 110 simultaneously. Because it is not detected that the hand approaches or touches the touch screen, there is no hand affecting the uplink signal at this time, so a method of using a full-screen transmission channel to send the uplink signal can make the stylus receive the uplink signal as soon as possible.

In another implementation manner, in 520, determine the sending mode according to whether the stylus approaches or touches the touch screen if it is detected that the hand approaches or touches the touch screen.

For example, determine that the sending mode is a second sending mode if it is not detected that the stylus approaches or touches the touch screen; and/or determine that the sending mode is a third sending mode if it is detected that the stylus approaches or touches the touch screen.

First, the second sending mode is described.

For the second sending mode, multiple groups of the transmission channels in the touch screen sends the uplink signal in sequence.

Specifically, the number of the transmission channels in each group of the multiple groups of the transmission channels is less than a preset value. For example, the preset value can be the number of the transmission channels covered by a projection of the hand on the touch screen when a user operates the stylus.

FIG. 3 and FIG. 4 show a capacitance C2 formed between a hand 140 and a signal source 130. The signal source 130 here is the transmission channel that currently sends the uplink signal. In an existing manner, all transmission channels in the touch screen 120 send the uplink signal simultaneously, and an action area between the signal source 130 and the hand 140 is a projected area of the hand 140 on the touch screen. The larger the active area between the signal source 130 and the hand 140, the larger the capacitance C2. In order to reduce the capacitance C2, the active area between the hand 140 and the signal source 130 needs to be reduced.

When it is detected that the hand approaches or touches the touch screen, and it is not detected that the stylus approaches or touches the touch screen, on the one hand, the hand can affect the uplink signal when the hand is detected to approach or touch the touch screen, thus, in order to reduce an influence of the hand, the number of each group of the transmission channels cannot be too large; on the other hand, a position of the stylus cannot be known when the stylus is not detected to approach or touch the touch screen, thus, the multiple groups of the transmission channels need to send the uplink signal cyclically to ensure that the stylus can receive the uplink signal.

Each group of the transmission channels can include at least one driving channel and/or at least one sensing channel.

And, the number of the transmission channels included in each group of the transmission channels can be equal or unequal.

The number of the transmission channels in each group of the transmission channels is less than a preset value. For example, the preset value can be between 6 and 10, preferably, the preset value is equal to 8.

Figure 7:
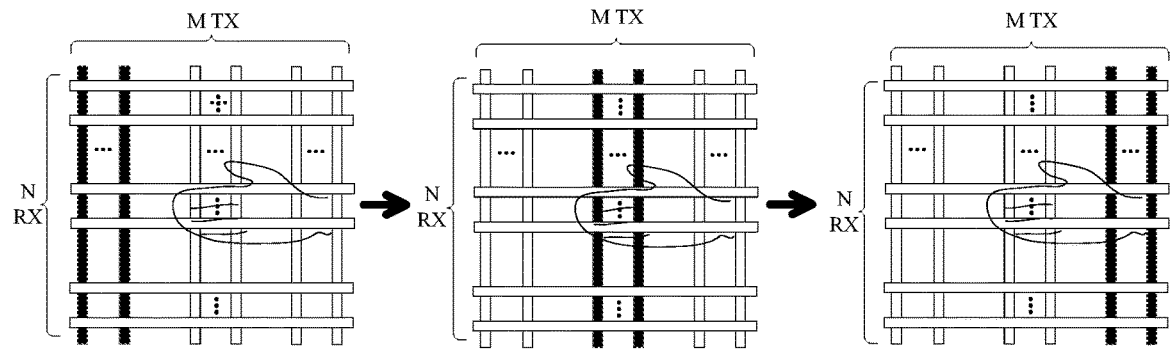
FIG. 7 to FIG. 9 are schematic diagrams of a second sending mode according to embodiments of the present application.

For example, as shown in FIG. 7, the touch screen includes M driving channels TX and N detection channels RX, and the touch screen sends the uplink signal through the TX channel. In the second sending mode, the TX channels in the touch screen are divided into multiple groups, and the multiple groups of the TX channels send the uplink signal in sequence from left to right, and only one group of the TX channels send the uplink signal at a time. FIG. 7 shows three transmissions of the uplink signal, where a black-filled transmission channel in each figure used to send the uplink signal this time.

Figure 8:
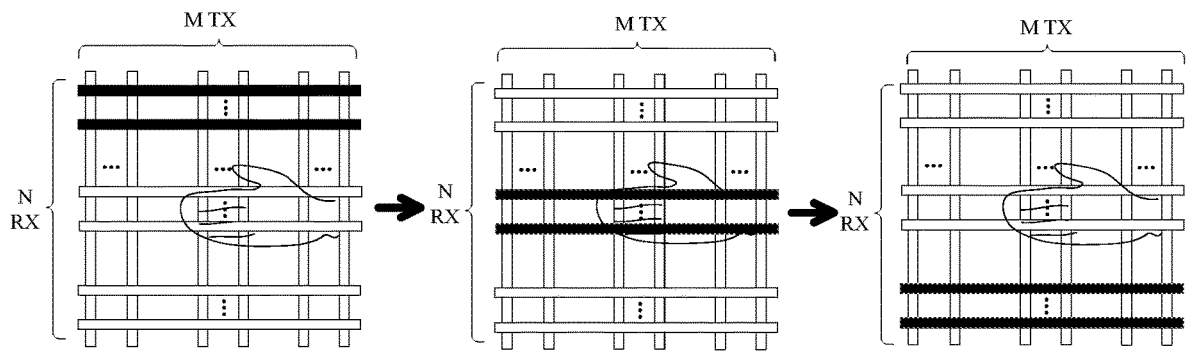

For another example, as shown in FIG. 8, the touch screen sends the uplink signal through the RX channel. In the second sending mode, the RX channels in the touch screen are divided into multiple groups, and the multiple groups of the RX channels send the uplink signal in sequence from top to bottom, and only one group of the RX channels send the uplink signal at a time. FIG. 8 shows three transmissions of the uplink signal, where a black-filled transmission channel in each figure used to send the uplink signal this time.

Figure 9:
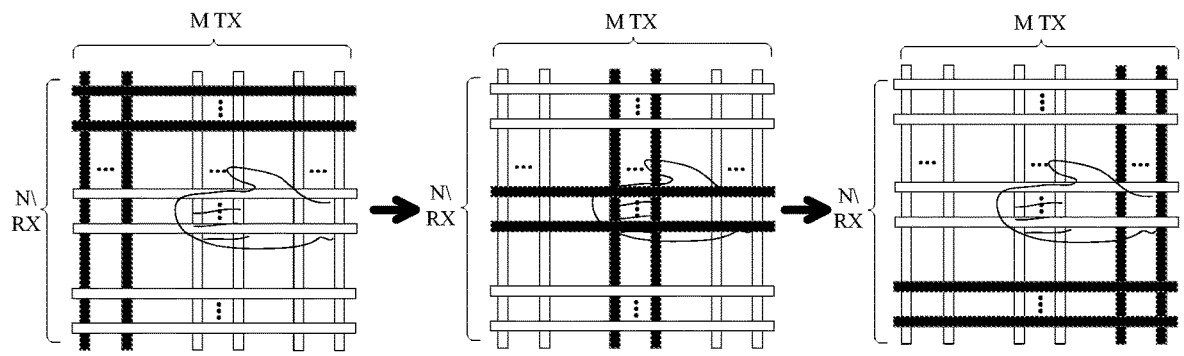

For another example, as shown in FIG. 9, the touch screen sends the uplink signal through the TX channel and the RX channel. In the second sending mode, the transmission channels in the touch screen are divided into multiple groups, and the multiple groups of the transmission channels send the uplink signal in sequence, and only one group of the transmission channels send the uplink signal at a time. FIG. 9 shows three transmissions of the uplink signal, where a black-filled transmission channel in each figure used to send the uplink signal this time.

In FIGS. 7-9, an active area between the hand and the signal source is not a projected area of the hand on the touch screen, but is a part of the projected area of the hand that overlaps with the transmission channel that currently sends the uplink signal. The number of the transmission channels sending the uplink signal each time is less than the number of the transmission channels covered by a projection of the hand on the touch screen, thus, the active area between the hand and the signal source is reduced, thereby reducing an influence of the hand on the uplink signal.

In the second sending mode, the transmission channels included in the touch screen are divided into multiple groups of the transmission channels, where the transmission channels included in each group of the transmission channels can be completely different, or can also be partially different. For example, taking the TX channel as the transmission channel as an example, a plurality of the TX channels in the touch screen can be grouped, and each group of the transmission channels includes two TX channels. Specifically, the two TX channels in each group can be completely different, for example, TX1 and TX2 are a group, TX3 and TX4 are a group, TX5 and TX6 are a group and so on. Or, the two TX channels in each group can be partially different, for example, TX1 and TX2 are a group, TX2 and TX3 are a group, TX3 and TX4 are a group, TX4 and TX5 are a group, TX5 and TX6 are a group and so on. Each group of the TX channels sends the uplink signal in turn.

Secondly, the third sending mode is described.

For the third sending mode, the transmission channel located near the stylus in the touch screen sends the uplink signal.

Specifically, the number of the transmission channels near the stylus is less than a preset value. For example, the preset value can be the number of the transmission channels covered by a projection of the hand on the touch screen when the user operates the stylus.

When it is detected that the hand approaches or touches the touch screen, and it is detected that the stylus approaches or touches the touch screen, on the one hand, the hand can affect the uplink signal when the hand is detected to approach or touch the touch screen, thus, in order to reduce an influence of the hand, the number of the transmission channels currently sending the uplink signal cannot be too large; on the other hand, the position of the stylus can be known when the stylus has been detected, thus, there is no need to send the uplink signal cyclically like the second sending mode, and the stylus can receive the uplink signal only by sending the uplink signal through the transmission channel near the stylus.

The transmission channel near the stylus can include at least one driving channel and/or at least one sensing channel. The number of the transmission channels near the stylus is less than a preset value. For example, the preset value can be between 6 and 10, preferably, the preset value is equal to 8.

Figure 10:
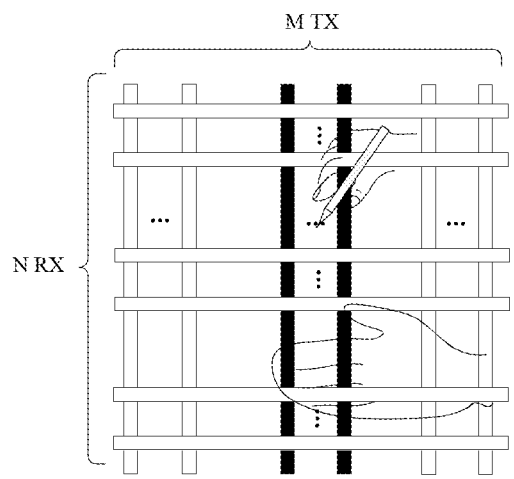
FIG. 10 to FIG. 12 are schematic diagrams of a third sending mode according to embodiments of the present application.
Figure 11:
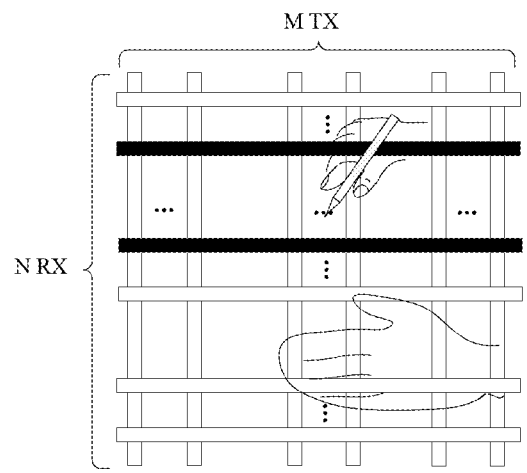

For example, as shown in FIG. 10, the touch screen includes M TX channels and N RX channels, and the touch screen sends the uplink signal through the TX channel. In the third sending mode, the TX channel located near the stylus in the touch screen sends the uplink signal. For another example, as shown in FIG. 11, the RX channel located near the stylus in the touch screen sends the uplink signal. For another example, as shown in FIG. 12, the RX channel and the TX channel located near the stylus in the touch screen send the uplink signal.

Figure 12:
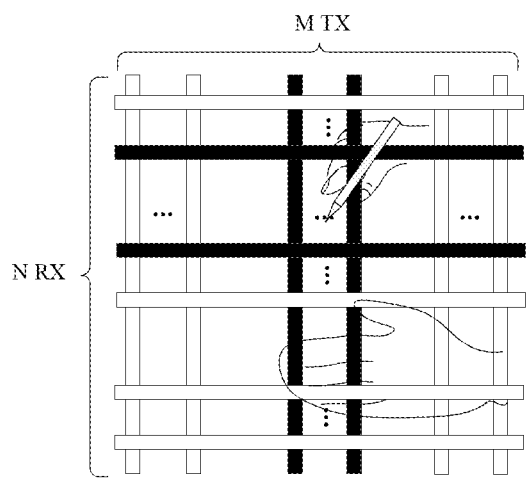

In FIGS. 10-12, the uplink signal can only be sent by the transmission channel near the stylus because the stylus has been detected. Specifically, the number of the transmission channels near the stylus needs to be smaller than the number of the transmission channels covered by a projection of the hand on the touch screen, so as to reduce the active area between the hand and the signal source, thereby reducing an influence of the hand on the uplink signal.

By detecting the hand and/or the stylus, an appropriate sending mode is selected among the three sending modes to send the uplink signal while ensuring an effective reception of the uplink signal by the stylus, which reduces the influence of the hand on the uplink signal. In a specific implementation, for example, an appropriate signal sending mode can be selected according to the flowchart shown in FIG. 13.

Figure 13:
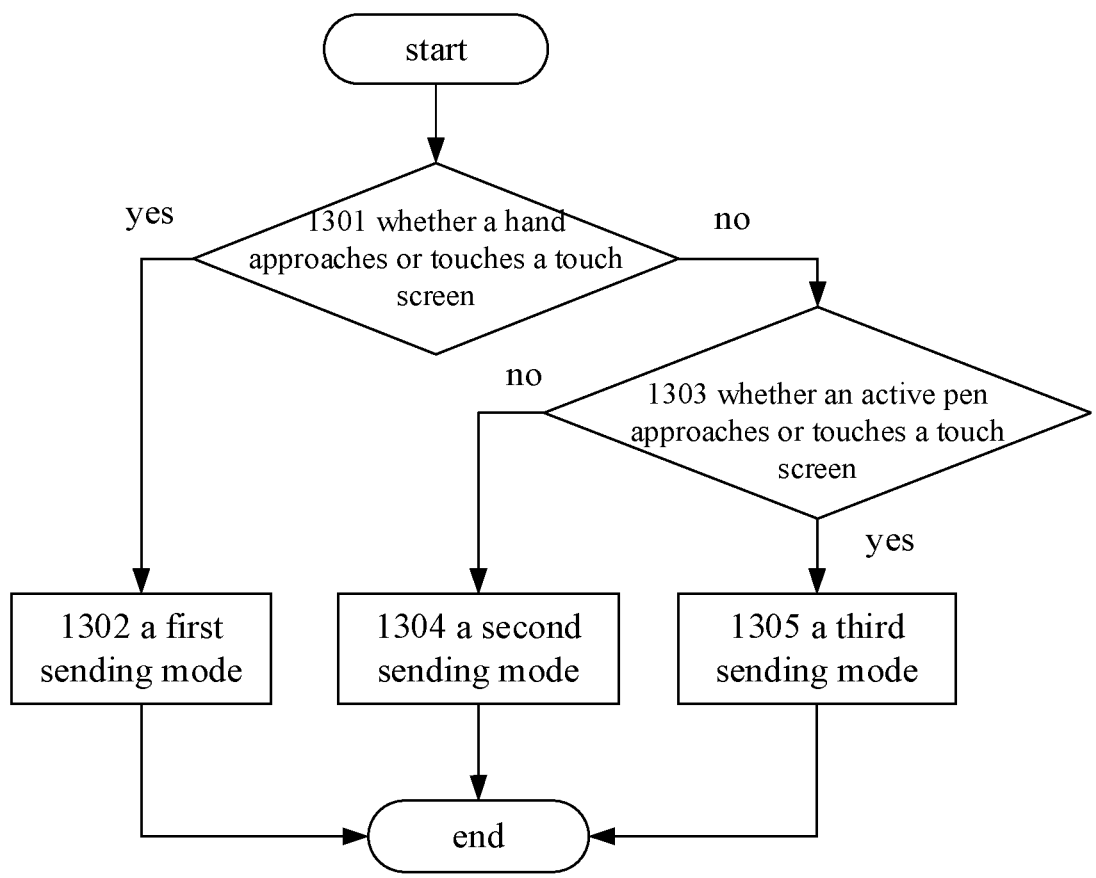
FIG. 13 is a flow chart of a possible implementation manner based on the method shown in FIG. 5.

FIG. 13 shows a flowchart of a possible implementation manner according to an embodiment of the present application. As shown in FIG. 13, the method can be performed by a touch control chip, specifically including the following steps:

1301, detect whether a user's hand approaches or touches the touch screen.

Specifically, if it is not detected that the hand approaches or touches the touch screen, then 1302 is executed; and if it is detected that the hand approaches or touches the touch screen, then 1303 is executed.

1302, select the first sending mode.

At this time, all sending modes in the touch screen send the uplink signal.

1303, detect whether a stylus approaches or touches the touch screen.

Specifically, if it is not detected that the stylus approaches or touches the touch screen, then 1304 is executed; and if it is detected that the stylus approaches or touches the touch screen, then 1305 is executed.

1304, select the second sending mode.

At this time, the multiple sending modes in the touch screen send the uplink signal cyclically.

1305, select the third sending mode.

At this time, the transmission channel located near the stylus in the touch screen sends the uplink signal.

In the embodiments of the present application, the sending mode of the uplink signal is determined according to the detection result of the hand and/or the stylus, where the transmission channel for sending the uplink signal in the touch screen is different in different sending modes. When it is not detected that the hand approaches or touches the touch screen, the hand does not affect the uplink signal, thus the first sending mode is selected, that is, all transmission channels are used to send the uplink signal, so that the stylus can receive the uplink signal as soon as possible; when it is detected that the hand approaches or touches the touch screen, or it is not detected that the stylus approaches or touches the touch screen, the second sending mode is selected because the position of the stylus is not known, that is, the multiple groups of the transmission channels send the uplink signal in sequence, and the active area between the hand and the signal source is reduced while ensuring that the stylus can receive the uplink signal, so as to reducing the influence of the hand on the uplink signal; when it is detected that the hand approaches or touches the touch screen, and it is detected that the stylus approaches or touches the touch screen, the third sending mode is selected because the position of the stylus can be known, and the transmission channel near the stylus can be used to send the uplink signal to reduce the active area between the hand and the signal source, so as to reducing the influence of the hand on the uplink signal. Specifically, for the second sending mode and the third sending mode, the number of the transmission channels simultaneously used to send the uplink signal at each time cannot be too large to avoid the influence of the hand on the uplink signal caused by too large active area between the signal source and the hand.

It should be understood that while the touch chip sends the uplink signal to the stylus through the transmission channel in the touch screen, the stylus and hand cannot be detected; similarly, the transmission channel in the touch screen can also not be used to send the uplink signal to the stylus while the touch chip detects the stylus and the hand. That is, a detection process and a sending process of the uplink signal may have respective timings, so that corresponding processes are executed at their respective times without conflict.

Figure 14:
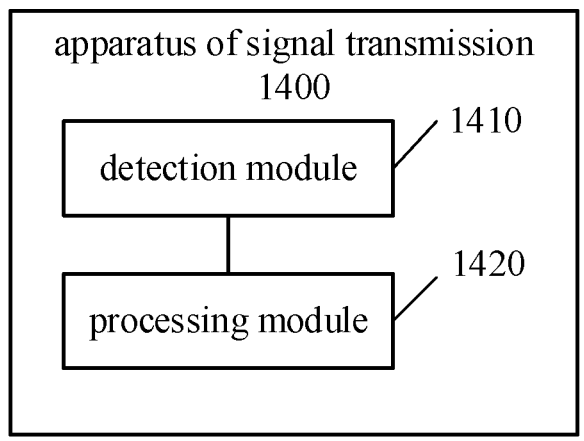
FIG. 14 is a schematic block diagram of an apparatus of signal transmission according to an embodiment of the present application.

The embodiments of the present application further provide an apparatus of signal transmission. The apparatus is provided in an electronic device, a touch screen of the electronic device includes a transmission channel for sending an uplink signal to a stylus, as shown in FIG. 14, an apparatus 1400 includes:

a detection module 1410 configured to detect whether a user's hand and/or the stylus approaches or touches the touch screen;

a processing module 1420 configured to determine a sending mode of the uplink signal according to a detection result, where the transmission channel for sending the uplink signal in the touch screen is different in different sending modes.

By detecting whether the user's hand and/or the stylus approaches or touches the touch screen, the apparatus 1400 determines the sending mode of the uplink signal according to the detection result. Because the transmission channel for sending the uplink signal in the touch screen is different in different sending modes, different transmission channels can be selected to send the uplink signal in different circumstances, so that transmission of the uplink signals is more flexible, improving transmission performance of the uplink signal.

Optionally, the transmission channel for sending the uplink signal in the touch screen is different in different sending modes, including at least one of the following differences: a position of the transmission channel, the number of the transmission channel, and a working timing of the transmission channel.

Optionally, the processing module 1420 is specifically configured to: determine that the sending mode is a first sending mode if the detection module detects that the hand approaches or touches the touch screen, where all transmission channels in the touch screen in the first sending mode send the uplink signal simultaneously.

Optionally, the processing module 1420 is specifically configured to: determine the sending mode according to whether the stylus approaches or touches the touch screen if the detection module detects that the hand approaches or touches the touch screen.

Optionally, the processing module 1420 is specifically configured to: determine that the sending mode is a second sending mode if the detection module does not detect that the stylus approaches or touches the touch screen, where multiple groups of the transmission channels in the touch screen send the uplink signal in sequence, and the number of the transmission channels in each group in the multiple groups of the transmission channels is less than a preset value.

Optionally, the preset value is the number of the transmission channels covered by a projection of the hand on the touch screen when a user operates the stylus.

Optionally, the preset value is between 6 and 10.

Optionally, the number of the transmission channels in the multiple groups of the transmission channels is the same or different.

Optionally, the processing module 1420 is specifically configured to: determine that the sending mode is a third sending mode if the detection module detects that the hand approaches or touches the touch screen, where the transmission channel located near the stylus in the touch screen in the third sending mode sends the uplink signal, and the number of the transmission channels near the stylus is less than a preset value.

Optionally, the preset value is the number of the transmission channels covered by a projection of the hand on the touch screen when a user operates the stylus.

Optionally, the preset value is between 6 and 10.

Optionally, the transmission channel for sending the uplink signal in the touch screen includes a driving channel and/or a detection channel.

It should be understood that the foregoing and other operations and/or functions of each module of the apparatus 1400 of signal transmission in the embodiments of the present application shown in FIG. 14 are separately used to implement corresponding procedures of the method of signal transmission in FIG. 5. For brevity, details are not described herein again.

The embodiments of the present application further provides a touch control chip, including the apparatus of signal transmission in the foregoing various embodiments of the present application.

The embodiments of the present application further provides an electronic device, including: a touch screen, the touch screen includes a transmission channel for sending an uplink signal to a stylus; and the touch control chip in the foregoing various embodiments of the present application.

By way of example and not limitation, the electronic device in the embodiments of the present application can be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a device such as a smart watch or smart glasses, that is of a full-featured and a large-sized and that can implement all or some functions without relying on a smart phone, and a device such as a smart bracelet or a smart jewelry for physical sign monitoring, that only focuses on a certain type of application function and shall be used in cooperation with other device such as a smart phone.

It should be noted that, in a case of no conflict, the various embodiments and/or the technical features in the various embodiments described in the present application may be combined with each other arbitrarily, and the technical solutions obtained after the combination should also fall within the protection scope of the present application.

It should be understood that specific examples in embodiments of the present application are just for helping those skilled in the art better understand the embodiments of the present application, rather than for limiting the scope of the embodiments of the present application. Those skilled in the art can make various improvements and variations on the basis of the above embodiments, and such improvements or variations are all within the protection scope of the present application.

The foregoing descriptions are merely specific embodiments of the present application, but the protection scope of the present application is not limited thereto, those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A method of signal transmission, wherein the method is performed by a touch control chip in an electronic device, a touch screen of the electronic device comprises a transmission channel for sending an uplink signal to a stylus, and the method comprises:
   detecting whether a the stylus approaches or touches the touch screen;
   determining a sending mode of the uplink signal according to a detection result, wherein the transmission channel for sending the uplink signal in the touch screen is different in different sending modes;
   wherein determining the sending mode of the uplink signal according to the detection result, comprising:
   determining that the sending mode is a second sending mode if it is not detected that the stylus approaches or touches the touch screen, wherein multiple groups of the transmission channels in the touch screen in the second sending mode send the uplink signal in sequence; and
   determining that the sending mode is a third sending mode if it is detected that the stylus approaches or touches the touch screen, wherein the transmission channel located near the stylus in the touch screen in the third sending mode sends the uplink signal.

2. The method according to claim 1, wherein the transmission channel for sending the uplink signal in the touch screen is different in different sending modes, comprising at least one of the following differences:
   a position of the transmission channel, the number of the transmission channel, and a working timing of the transmission channel.

3. The method according to claim 1, wherein further comprising:
   detecting whether a user's hand approaches or touches the touch screen;
   determining that the sending mode is a first sending mode if it is detected that the hand does not approach or touch the touch screen, wherein all transmission channels in the touch screen send the uplink signal simultaneously in the first sending mode.

4. The method according to claim 3, wherein detecting whether the stylus approaches or touches the touch screen, comprising:
   detecting whether the stylus approaches or touches the touch screen if it is detected that the hand approaches or touches the touch screen.

5. The method according to claim 1, wherein in the second sending mode, the number of the transmission channels in each group in the multiple groups of the transmission channels is less than a preset value, and the preset value is the number of the transmission channels covered by a projection of the hand on the touch screen when a user operates the stylus;
   the preset value is between 6 and 10; and
   the number of the transmission channels in the multiple groups of the transmission channels is the same or different.

6. The method according to claim 1, wherein in the third sending mode, the number of the transmission channels near the stylus is less than a preset value, and the preset value is the number of the transmission channels covered by a projection of the hand on the touch screen when a user operates the stylus; and
   the preset value is between 6 and 10.

7. The method according to claim 1, wherein the transmission channel for sending the uplink signal in the touch screen comprises a driving channel and/or a detection channel.

8. An apparatus of signal transmission, wherein the apparatus is provided in an electronic device, a touch screen of the electronic device comprises a transmission channel for sending an uplink signal to a stylus, and the apparatus comprises:
   a processor configured to detect whether a user's hand and/or the stylus approaches or touches the touch screen;
   the processor further configured to determine a sending mode of the uplink signal according to a detection result, wherein the transmission channel for sending the uplink signal in the touch screen is different in different sending modes;
   wherein the processor is specifically configured to:
   determine that the sending mode is a second sending mode if it is not detected that the stylus approaches or touches the touch screen, wherein multiple groups of the transmission channels in the touch screen in the second sending mode send the uplink signal in sequence; and determine that the sending mode is a third sending mode if it is detected that the stylus approaches or touches the touch screen, wherein the transmission channel located near the stylus in the touch screen in the third sending mode sends the uplink signal.

9. The apparatus according to claim 8, wherein the transmission channel for sending the uplink signal in the touch screen is different in different sending modes, comprising at least one of the following differences:

a position of the transmission channel, the number of the transmission channel, and a working timing of the transmission channel.

10. The apparatus according to claim 9, wherein the processor p is further configured to:

detect whether a user's hand approaches or touches the touch screen;

determine that the sending mode is a first sending mode if the detection module detects that the hand does not approach or touch the touch screen.

11. The apparatus according to claim 8, wherein the processor is specifically configured to:

detecting whether the stylus approaches or touches the touch screen if the detection module detects that the hand approaches or touches the touch screen.

12. The apparatus according to claim 8, wherein in the second sending mode, the number of the transmission channels in each group in the multiple groups of the transmission channels is less than a preset value, and the preset value is the number of the transmission channels covered by a projection of the hand on the touch screen when a user operates the stylus;

the preset value is between 6 and 10; and the number of the transmission channels in the multiple groups of the transmission channels is the same or different.

13. The apparatus according to claim 8, wherein in the third sending mode, the number of the transmission channels near the stylus is less than a preset value, and the preset value is the number of the transmission channels covered by a projection of the hand on the touch screen when a user operates the stylus; and the preset value is between 6 and 10.

14. The apparatus according to claim 8, wherein the transmission channel for sending the uplink signal in the touch screen comprises a driving channel and/or a detection channel.

15. A touch control chip, comprising:

the apparatus of signal transmission according to the above claim 8.

16. An electronic device, comprising:

a touch screen, the touch screen comprises a transmission channel for sending an uplink signal to a stylus; and the touch control chip according to the above claim 15.

* * * * *